United States Patent
Kim et al.

(10) Patent No.: US 10,511,668 B2
(45) Date of Patent: Dec. 17, 2019

(54) METHOD OF TRANSMITTING AND RECEIVING DATA IN VEHICLE NETWORK AND APPARATUS FOR THE SAME

(71) Applicants: HYUNDAI MOTOR COMPANY, Seoul (KR); KIA MOTORS CORPORATION, Seoul (KR)

(72) Inventors: Dong Ok Kim, Goyang-si (KR); Sang Woo Yu, Hwaseong-si (KR); Jin Hwa Yun, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 7 days.

(21) Appl. No.: 15/719,398

(22) Filed: Sep. 28, 2017

(65) Prior Publication Data

US 2018/0103108 A1    Apr. 12, 2018

(30) Foreign Application Priority Data

Oct. 7, 2016   (KR) .................. 10-2016-0130061
Aug. 21, 2017  (KR) .................. 10-2017-0105624

(51) Int. Cl.
*H04L 29/08* (2006.01)
*H04L 29/06* (2006.01)

(52) U.S. Cl.
CPC .............. *H04L 67/12* (2013.01); *H04L 69/06* (2013.01); *H04L 69/16* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 9,910,865 B2* | 3/2018 | Mikolajczyk | G06F 16/58 |
| 10,142,270 B2* | 11/2018 | Katis | H04L 51/10 |
| 2008/0043684 A1* | 2/2008 | Hovey | H04L 69/04 370/338 |
| 2013/0097616 A1* | 4/2013 | Bickle | G06F 8/447 719/315 |
| 2014/0080428 A1* | 3/2014 | Rhoads | H04W 4/70 455/88 |
| 2015/0229741 A1* | 8/2015 | Kim | H04L 12/4625 370/467 |
| 2016/0182093 A1* | 6/2016 | Yang | H03M 13/3994 714/776 |
| 2016/0294497 A1* | 10/2016 | Zinner | H04J 3/0635 |

* cited by examiner

*Primary Examiner* — Eunsook Choi

(74) *Attorney, Agent, or Firm* — Morgan, Lewis & Bockius LLP

(57) ABSTRACT

An operation method of a first communication node in an Ethernet-based vehicle network includes: generating a data message including data when there is data to be transmitted to a second communication node belonging to the Ethernet-based vehicle network; and transmitting the data message to the second communication node. The data message further includes a first indicator indicating a type of the data and a second indicator indicating an encoding scheme applied to the data, such that a vehicle network even in an existing vehicle can support transmission and reception of information for the new IT service, and the performance of the vehicle network can be improved.

20 Claims, 5 Drawing Sheets

METHOD OF TRANSMITTING AND RECEIVING DATA IN VEHICLE NETWORK AND APPARATUS FOR THE SAME

CROSS-REFERENCE TO RELATED APPLICATIONS

This application is based on and claims the benefit of priority to Korean Patent Applications No. 10-2016-0130061 filed on Oct. 7, 2016 and No. 10-2017-0105624 filed on Aug. 21, 2017 in the Korean Intellectual Property Office (KIPO), the entirety of which is incorporated by reference as if fully set forth herein.

TECHNICAL FIELD

The present disclosure relates to a communication technology in a vehicle network, and more specifically, to techniques for transmitting and receiving information (e.g., text, image, etc.) for a new information technology (IT) service in a vehicle network.

BACKGROUND

Electronic devices installed in a vehicle have been increased significantly in their number and variety along with recent digitalization of vehicle parts. Generally, the electronic devices may be used throughout the vehicle, for example, a power train control system (e.g., an engine control system, an automatic transmission control system, or the like), a body control system (e.g., a body electronic equipment control system, a convenience apparatus control system, a lamp control system, or the like), a chassis control system (e.g., a steering apparatus control system, a brake control system, a suspension control system, or the like), a vehicle network (e.g., a controller area network (CAN), a FlexRay-based network, a media oriented system transport (MOST)-based network, or the like), a multimedia system (e.g., a navigation apparatus system, a telematics system, an infotainment system, or the like), and so forth.

The electronic devices used in each of these systems are connected via the vehicle network, which supports functions of the electronic devices. For instance, the CAN may support a transmission rate of up to 1 Mbps and support automatic retransmission of colliding messages, error detection based on a cycle redundancy interface (CRC), or the like. The FlexRay-based network may support a transmission rate of up to 10 Mbps and support simultaneous transmission of data through two channels, synchronous data transmission, or the like. The MOST-based network is a communication network for high-quality multimedia, which may support a transmission rate of up to 150 Mbps.

The telematics system and the infotainment system, as most enhanced safety systems of a vehicle do, require higher transmission rates and system expandability. However, the CAN, FlexRay-based network, and the like may not sufficiently support such requirements. The MOST-based network, in particular, may support a higher transmission rate than the CAN or the FlexRay-based network. However, applying the MOST-based network to vehicle networks can be costly. Due to these limitations, an Ethernet-based network is often utilized as a vehicle network. The Ethernet-based network may support bi-directional communication through one pair of windings and may support a transmission rate of up to 10 Gbps.

In accordance with the development of IT technology, new IT services (e.g., a service for providing navigation information through a head-up display (HUD) device, a service providing a call function through a hands-free device, a streaming service, etc.) are emerging, and such the new IT services can be applied to a vehicle. In case that such the new IT service is applied to a vehicle, transmission and reception procedures for information (e.g., text, image (e.g., icon)) for the new IT service need to be specified. However, if a new IT service is to be applied to an existing vehicle, there is a problem that transmission and reception of information for the new IT service cannot be supported in the vehicle network of the existing vehicle.

SUMMARY

The present disclosure provides a method and an apparatus for transmitting and receiving information for a new IT service in a vehicle network.

In accordance with embodiments of the present disclosure, an operation method of a first communication node in an Ethernet-based vehicle network may comprise generating a data message including data when there is data to be transmitted to a second communication node belonging to the Ethernet-based vehicle network; and transmitting the data message to the second communication node. Also, the data message may further comprise a first indicator indicating a type of the data and a second indicator indicating an encoding scheme applied to the data.

The data message may include an Ethernet header, an internet protocol (IP) header, a user datagram protocol (UDP) header, a message identifier (ID) field, a length field, a flag field, a reserved field, a sequence number field, and a payload including the data.

The first indicator may be included in the message ID field, and indicate that the type of the data included in the payload is text or image.

The first indicator may be included in the flag field, and indicate that the type of the data included in the payload is text or image.

The second indicator may be included in the reserved field, and when the type of the data included in the payload is text, the second indicator may indicate the encoding scheme applied to the data which are text data.

The second indicator may be included in the reserved field, and when the type of the data included in the payload is image, the second indicator may indicate the encoding scheme applied to the data which are image data.

When the type of the data included in the payload is image, the reserved field of the data message may further include a third indicator indicating a resolution of the data which are image data.

Further, in accordance with embodiments of the present disclosure, an operation method of a first communication node in an Ethernet-based vehicle network may comprise receiving a data message including data from a second communication node belonging to the Ethernet-based vehicle network; identifying a type of the data based on a first indicator included in the data message; identifying an encoding scheme applied to the data based on the type of the data and a second indicator included in the data message; and decoding the data included in the data message using a decoding scheme corresponding to the encoding scheme.

The data message may include an Ethernet header, an internet protocol (IP) header, a user datagram protocol (UDP) header, a message identifier (ID) field, a length field, a flag field, a reserved field, a sequence number field, and a payload including the data.

The first indicator may be included in the message ID field, and indicate that the type of the data included in the payload is text or image.

The first indicator may be included in the flag field, and indicate that the type of the data included in the payload is text or image.

The second indicator may be included in the reserved field, and when the type of the data included in the payload is text, the second indicator may indicate the encoding scheme applied to the data which are text data.

The second indicator may be included in the reserved field, and when the type of the data included in the payload is image, the second indicator may indicate the encoding scheme applied to the data which are image data.

When the type of the data included in the payload is image, the reserved field of the data message may further include a third indicator indicating a resolution of the data which are image data.

Further, in accordance with embodiments of the present disclosure, a first communication node in an Ethernet-based vehicle network may comprise a processor and a memory storing at least one instruction executed by the processor. Also, the at least one instruction may be configured to generate a data message including data when there is data to be transmitted to a second communication node belonging to the Ethernet-based vehicle network; and transmit the data message to the second communication node. Also, the data message may further comprise a first indicator indicating a type of the data and a second indicator indicating an encoding scheme applied to the data.

The data message may include an Ethernet header, an internet protocol (IP) header, a user datagram protocol (UDP) header, a message identifier (ID) field, a length field, a flag field, a reserved field, a sequence number field, and a payload including the data.

The first indicator may be included in the message ID field or the flag field, and indicate that the type of the data included in the payload is text or image.

The second indicator may be included in the reserved field, and when the type of the data included in the payload is text, the second indicator may indicate the encoding scheme applied to the data which are text data.

The second indicator may be included in the reserved field, and when the type of the data included in the payload is image, the second indicator may indicate the encoding scheme applied to the data which are image data.

When the type of the data included in the payload is image, the reserved field of the data message may further include a third indicator indicating a resolution of the data which are image data.

According to the embodiments of the present disclosure, even when a new IT service (e.g., a service for providing navigation information through a head-up display (HUD) device, a service for providing a call function through a hands-free device, a streaming service, etc.) is provided to an existing vehicle, transmission and reception of information (e.g., text or images (e.g., icons)) for the new IT service can be made possible in a vehicle network of the existing vehicle.

For example, a transmitting communication node may generate a data message that includes the type of data (e.g., text or image), the encoding scheme of the data, etc., and may transmit the generated data message to a receiving communication node. The receiving communication node can receive the data message from the transmitting communication node, and can identify the type of data, the encoding scheme, and the like based on the information included in the received data message. Therefore, the receiving communication node can decode the data included in the data message based on the identified type of the data, the identified encoding scheme, and the like. Therefore, the vehicle network even in the existing vehicle can support the transmission and reception of the information for the new IT service, and the performance of the vehicle network can be improved.

BRIEF DESCRIPTION OF DRAWINGS

Embodiments of the present disclosure will become more apparent by describing in detail forms of the present disclosure with reference to the accompanying drawings, in which.

Figure 1:
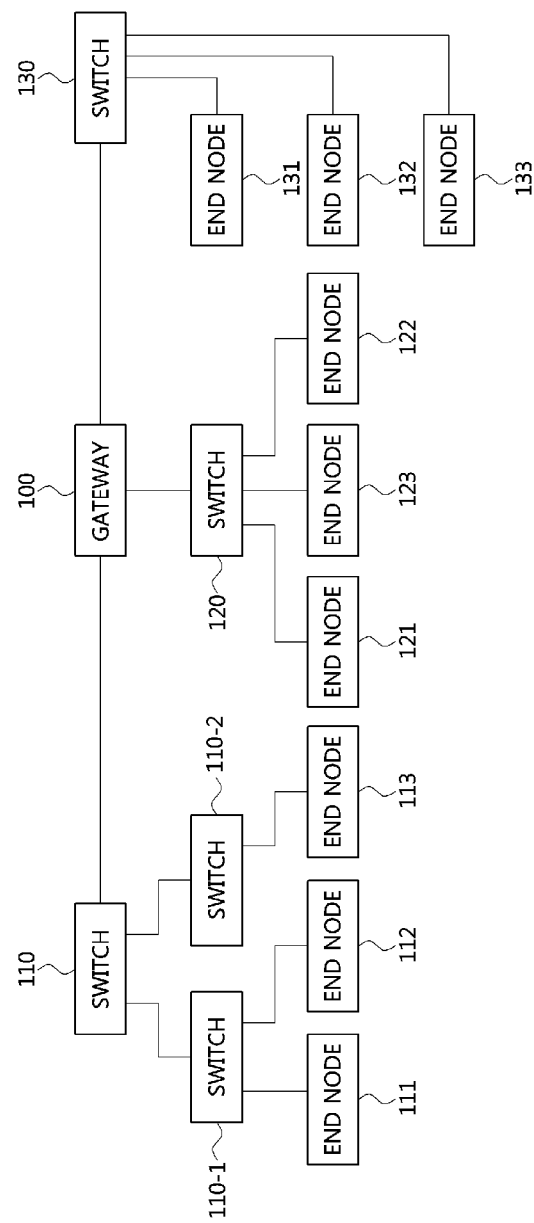
FIG. 1 is a block diagram illustrating a first embodiment of a vehicle network topology.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular forms only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although forms are described herein as using a plurality of units to perform the exemplary process, it is understood that the exemplary processes may also be performed by one or plurality of modules. Additionally, it is understood that a controller/control unit may perform one or more of the processes described further below, and the term controller/control unit refers to a hardware device that includes a memory and a processor. The memory is configured to store the modules, and the processor is specifically configured to execute said modules to perform one or more processes which are described further below. Moreover, it is understood that the units or modules described herein may embody a controller/control unit for controlling operation of the unit or module.

Furthermore, control logic of the present disclosure may be embodied as non-transitory computer readable media on a computer readable medium containing executable program instructions executed by a processor, controller/control unit or the like. Examples of the computer readable mediums include, but are not limited to, read-only memory (ROM), random access memory (RAM), compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Since the present disclosure may be variously modified and have several forms, specific embodiments will be shown in the accompanying drawings and be described in detail in the detailed description. It should be understood, however, that it is not intended to limit the present disclosure to the specific embodiments but, on the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without being departed from the scope of the present disclosure and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be located therebetween. In contrast, when it is mentioned that a certain component is "directly coupled with" or "directly connected with" another component, it will be understood that a further component is not located therebetween.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Unless otherwise defined, all terms (including technical and scientific terms) used herein have the same meaning as commonly understood by one of ordinary skill in the art to which this disclosure belongs. Terms such as terms that are generally used and have been in dictionaries should be construed as having meanings matched with contextual meanings in the art. In this description, unless defined clearly, terms are not ideally, excessively construed as formal meanings.

Hereinafter, forms of the present disclosure will be described in detail with reference to the accompanying drawings. In describing the disclosure, to facilitate the entire understanding of the disclosure, like numbers refer to like elements throughout the description of the figures and the repetitive description thereof will be omitted.

FIG. 1 is a block diagram illustrating a first embodiment of a vehicle network topology.

Referring to FIG. 1, a communication node constituting a vehicle network may be a gateway, a switch (or bridge), or an end node. The gateway 100 may be connected with at least one switch 110, 110-1, 110-2, 120, and 130, and may be configured to connect different networks. For example, the gateway 100 may support connections between a switch which supports a controller area network (CAN) (or, FlexRay, media oriented system transport (MOST), or local interconnect network (LIN) network) and a switch which supports an Ethernet protocol. Each of the switches 110, 110-1, 110-2, 120, and 130 may be connected to at least one of end nodes 111, 112, 113, 121, 122, 123, 131, 132, and 133. Each of the switches 110, 110-1, 110-2, 120, and 130 may interconnect the end nodes 111, 112, 113, 121, 122, 123, 131, 132, and 133, and control at least one of the end nodes 111, 112, 113, 121, 122, 123, 131, 132, and 133 connected to the switch.

Each of the end nodes 111, 112, 113, 121, 122, 123, 131, 132, and 133 may include an electronic control unit (ECU) configured to control various types of devices mounted within a vehicle. For example, each of the end nodes 111, 112, 113, 121, 122, 123, 131, 132, and 133 may include an ECU included in an infotainment device (e.g., a display device, a navigation device, and an around view monitoring device).

Meanwhile, the communication nodes (i.e., gateways, switches, end nodes, etc.) constituting the vehicle network may be connected in a star topology, a bus topology, a ring topology, a tree topology, a mesh topology, or the like. Further, each of the communication nodes constituting the vehicle network may support the CAN protocol, the FlexRay protocol, the MOST protocol, the LIN protocol, the Ethernet protocol, or the like. A communication node belonging to the vehicle network may be configured as follows.

Figure 2:
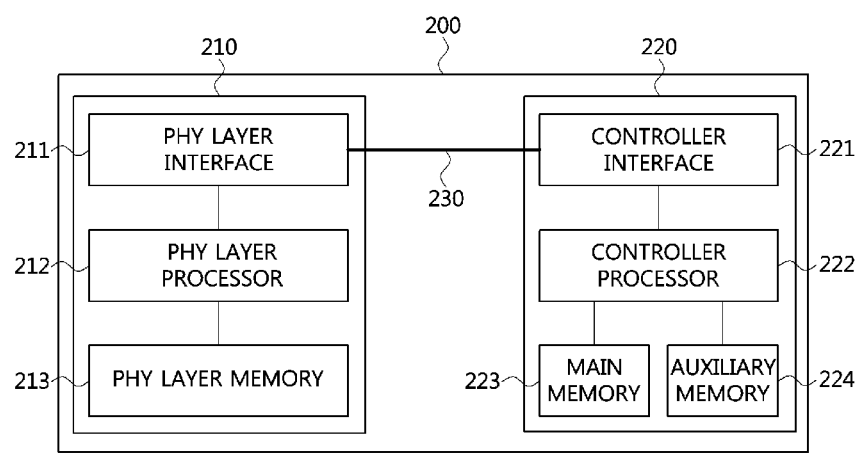
FIG. 2 is a block diagram illustrating a first embodiment of a communication node belonging to a vehicle network.

FIG. 2 is a block diagram illustrating a first embodiment of a communication node belonging to a vehicle network.

Referring to FIG. 2, a communication node 200 constituting a vehicle network illustrated in, e.g., FIG. 1, may include a physical (PHY) layer 210 and a controller 220. Also, the communication node 200 may further include a regulator (not shown) for supplying power. In particular, the controller 220 may be implemented to include a medium access control (MAC) layer. The PHY layer 210 may be configured to receive or transmit signals from or to another communication node. The controller 220 may be configured to control the PHY layer 210 and perform various functions (e.g., an infotainment function, or the like.). The PHY layer 210 and the controller 220 may be implemented as one system on chip (SoC), or alternatively may be implemented as separate chips.

The PHY layer 210 and the controller 220 may be connected via a media independent interface (MII) 230. The MII 230 may include an interface defined in the IEEE 802.3 and may include a data interface and a management interface between the PHY layer 210 and the controller 220. One of a reduced MII (RMII), a gigabit MII (GMII), a reduced GMII (RGMII), a serial GMII (SGMII), a 10 GMII (XGMII) may be used instead of the MII 230. The data interface may include a transmission channel and a reception channel, each of which may have independent clock, data, and control signal. The management interface may include a two-signal interface, one signal for the clock and one signal for the data.

The PHY layer 210 may include a PHY layer interface 211, a PHY layer processor 212, and a PHY layer memory 213. The configuration of the PHY layer 210 is not limited thereto, and the PHY layer 210 may be configured in various ways. The PHY layer interface 211 may be configured to transmit a signal received from the controller 220 to the PHY layer processor 212 and transmit a signal received from the PHY layer processor 212 to the controller 220. The PHY layer processor 212 may be configured to control operations of the PHY layer interface 211 and the PHY layer memory 213. The PHY layer processor 212 may be configured to modulate a signal to be transmitted or demodulate a received signal. The PHY layer processor 212 may be configured to control the PHY layer memory 213 to input or output a signal. The PHY layer memory 213 may be configured to store the received signal and output the stored signal based on a request from the PHY layer processor 212.

The controller 220 may be configured to monitor and control the PHY layer 210 using the MII 230. The controller 220 may include a controller interface 221, a controller processor 222, a main memory 223, and an auxiliary memory 224. The controller processor 222 is an electric circuitry which performs various functions described below. The configuration of the controller 220 is not limited thereto, and the controller 220 may be configured in various ways. The controller interface 221 may be configured to receive a signal from the PHY layer 210 (e.g., the PHY layer interface 211) or an upper layer (not shown), transmit the received signal to the controller processor 222, and transmit the signal received from the controller processor 222 to the PHY layer 210 or the upper layer. The controller processor 222 may further include independent memory control logic or integrated memory control logic for controlling the controller interface 221, the main memory 223, and the auxiliary memory 224. The memory control logic may be implemented to be included in the main memory 223 and the auxiliary memory 224 or may be implemented to be included in the controller processor 222.

Each of the main memory 223 and the auxiliary memory 224 may be configured to store a signal processed by the controller processor 222 and may be configured to output the stored signal based on a request from the controller processor 222. The main memory 223 may be a volatile memory (e.g., RAM) configured to temporarily store data required for the operation of the controller processor 222. The auxiliary memory 224 may be a non-volatile memory in which an operating system code (e.g., a kernel and a device driver) and an application program code for performing a function of the controller 220 may be stored. A flash memory having a high processing speed, a hard disc drive (HDD), or a compact disc-read only memory (CD-ROM) for large capacity data storage may be used as the non-volatile memory. Typically, the controller processor 222 may include a logic circuit having at least one processing core. A core of an Advanced RISC Machines (ARM) family or a core of an Atom family may be used as the controller processor 222.

Figure 3:
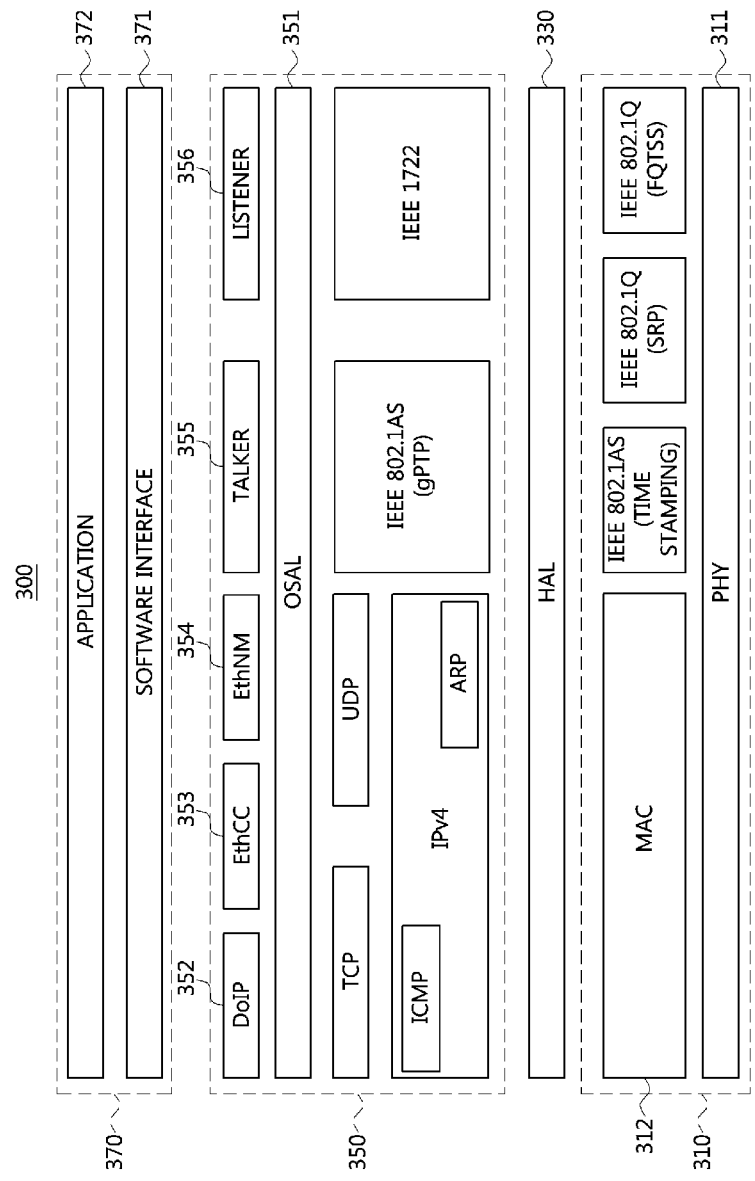
FIG. 3 is a block diagram illustrating a second embodiment of a communication node belonging to a vehicle network.

FIG. 3 is a block diagram illustrating a second embodiment of a communication node belonging to a vehicle network.

Referring to FIG. 3, a communication node 300 constituting a vehicle network may include a hardware layer 310, a hardware abstraction layer (HAL) 330, a middleware layer 350, and an application layer 370. The hardware layer 310 may include a PHY layer 311 and a MAC layer 312. The PHY layer 311 may support the Ethernet protocol and may correspond to the PHY layer 210 described with reference to FIG. 2. The MAC layer 312 may support the Ethernet protocol (e.g., IEEE 802.3, etc.) and may correspond to the controller 220 described with reference to FIG. 2.

The hardware layer 310 may support the audio video bridging (AVB) protocol. For example, the hardware layer 310 may support IEEE 802.1AS time stamping protocol, IEEE 802.1Q stream reservation protocol (SRP), IEEE 802.1Q forwarding & queuing for time-sensitive stream (FQTSS) protocol, etc. The IEEE 802.1AS time stamping protocol may support a stamping operation on a transmission or reception time of a message according to IEEE 802.1AS. The IEEE 802.1Q SRP protocol may support reservation operations of stream resources, reservation operations of traffic shaper, and the like. The IEEE 802.1Q FQTSS protocol may support shaping operation on messages to be transmitted, and the like. The hardware layer 310 may support the HAL 330 to enable the middleware layer 350 to operate.

The hardware layer 310 may support three modes. For example, the hardware layer 310 may support a normal mode, a sleep mode, and a power-off mode. In the normal mode, Ethernet communications can be performed. The PHY layer 311 may operate in a normal mode (e.g., an INH pin in an active state) and the MAC layer 312 may operate in an active mode (e.g., a state capable of transmitting and receiving messages). In the sleep mode, Ethernet communications can be performed with limited use of minimal power. When the hardware layer 310 is in the sleep mode, the PHY layer 311 may operate in a sleep mode (e.g., an INH pin in an inactive state) and may be woken up when a remote event is detected. Also, the MAC layer 312 may operate in an inactive mode (e.g., a state in which messages cannot be transmitted or received), and may be woken up when a local event is detected.

In a case that the state of the hardware layer 310 is in the power-off mode, the PHY layer 311 may operate in the sleep mode (e.g., an INH pin in an inactive state), and may be woken up when a remote event is detected. Also, the MAC layer 312 may operate in the inactive mode, and power may not be supplied to the MAC layer 312. That is, the MAC layer 312 cannot be woken up by a local event. The configuration of the hardware layer 310 is not limited to that described above, and the hardware layer 310 may be configured in various ways.

The middleware layer 350 may include an IP middleware layer operating based on a transfer control protocol/internet protocol (TCP/IP), an AVB middleware operating based on the AVB protocol, and an OSAL 351. The IP middleware layer may include a diagnostics over internet protocol (DoIP) unit 352, an EthCC unit 353, an EthNM unit 354, and the like. The DoIP unit 352 may be configured to perform diagnostic communications. The EthCC unit 353 may be configured to transmit and receive control messages. The EthNM unit 354 may be configured to perform network management. The IP middleware layer may support IPv4, internet control message protocol (ICMP), address resolution protocol (ARP), TCP, and UDP. The UDP may process the CRC, the alive counter, etc. for control messages or management messages.

The AVB middleware layer may include a talker unit 355, a listener unit 356, and the like. The talker unit 355 may be configured to perform transmission of an AVB stream based on the AVB protocol. The listener unit 356 may be configured to perform reception of the AVB stream based on the AVB protocol. The AVB middleware layer may support IEEE 802.1AS generalized precision time protocol (gPTP), IEEE 1722 AVB transport protocol (AVTP), etc. The IEEE 802.1AS gPTP may support an operation for selecting a grand master based on a best master clock algorithm (BMCA), an operation for clock synchronization, an operation for calculating a link delay, and the like. The IEEE 1722 AVTP may support operations such as generating an Ethernet message including an audio data unit and a video data unit.

The application layer 370 may include a software interface 371, an application 372, and the like. The software interface 371 may support input and output operations of signals for the application 372. The application 372 may include an application running on TCP/IP, an application running on the AVB protocol, and the like.

In accordance with the development of IT technology, new IT services (e.g., a service for providing navigation information through a head-up display (HUD) device, a service providing a call function through a hands-free device, a streaming service, etc.) are emerging, and such the new IT services can be applied to a vehicle. For example, the functionality of such the new IT services may be added to a head unit of the vehicle, and the head unit may be configured to provide information (e.g., text, image (e.g., icon), etc.) to a display device (e.g., a HUD device, a cluster, a navigation device, etc.) and the display device may display the information received from the head unit. Therefore, the user of the vehicle can acquire information according to the performance of the new IT services through the display device.

However, if the display device does not know an encoding manner applied to the information for the new IT services, the display device may not be able to decode the information received from the head unit. Therefore, a communication protocol for supporting new IT services in the vehicle network will be needed.

In the following description, methods of transmitting and receiving information for the new IT services in a vehicle network will be described. Hereinafter, even when a method (e.g., transmission or reception of a signal) to be performed at a first communication node is described, a counterpart second communication node corresponding to the first communication node may perform a method (e.g., reception or transmission of the signal) corresponding to the method performed at the first communication node. That is, when the operation of the first communication node is described, the corresponding second communication node can perform a counterpart operation corresponding to the operation of the first communication node. Conversely, when the operation of the second communication node is described, the corresponding first communication node can perform a counterpart operation corresponding to the operation of the second communication node.

Figure 4:
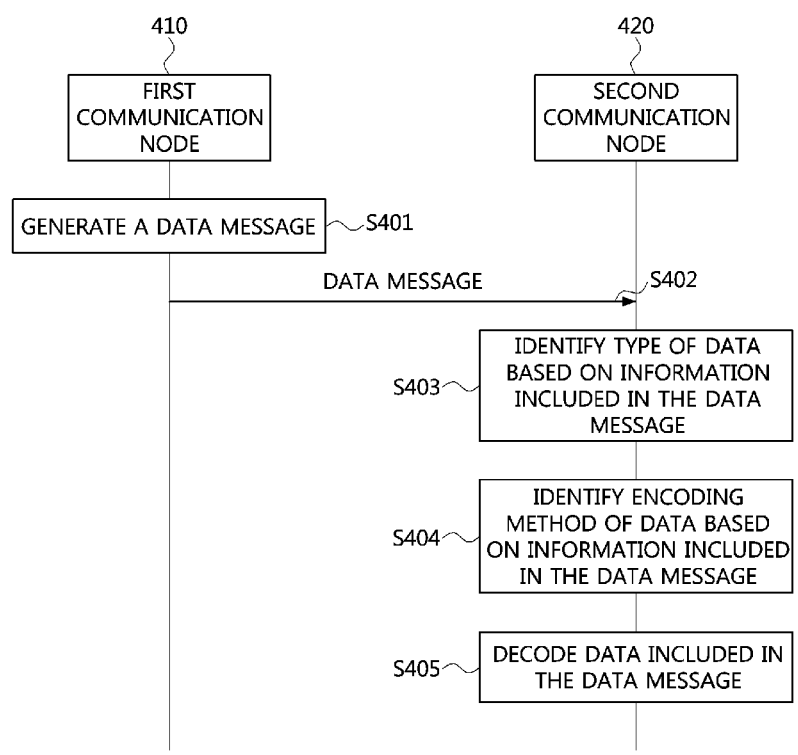
FIG. 4 is a flow chart for explaining a first embodiment of a data message transmission and reception method in a vehicle network.

FIG. 4 is a flow chart for explaining a first embodiment of a data message transmission and reception method in a vehicle network.

Referring to FIG. 4, a vehicle network may include a first communication node 410, a second communication node 420, and the like. Each of the first communication node 410 and the second communication node 420 may be one of the end nodes 111, 112, 113, 121, 122, 123, 131, 132, and 133 belonging to the vehicle network of FIG. 1. The first communication node 410 and the second communication node 420 may support the CAN protocol, the FlexRay protocol, the MOST protocol, the LIN protocol, the Ethernet protocol, and the like. For example, communication between the first communication node 410 and the second communication node 420 may be performed based on the Ethernet protocol. The first communication node 410 and the second communication node 420 may be configured the same or similar to the communication node 200 illustrated in FIG. 2 (or the communication node 300 illustrated in FIG. 3).

Also, the first communication node 410 and the second communication node 420 may support a new IT service (a service for providing navigation information through a head-up display (HUD) device, a service providing a call function through a hands-free device, a streaming service, etc.). The first communication node 410 may be a head unit of a vehicle and the second communication node 420 may be a device that displays information received from the head unit (e.g., a HUD device, a cluster, a navigation device, etc.).

If there is data to be transmitted to the second communication node 420, the first communication node 410 may generate a data message including the corresponding data (S401). The type of data included in the data message may be text, image (e.g., an icon), or the like. The data included in the data message may be generated according to a new IT service (e.g., an application). For example, data included in the data message may be generated according to the following scenario.

Scenario 1: a case that navigation information (e.g., speed, direction, street name, etc.) to be transmitted from the head unit to the HUD device (or cluster) exist Scenario 2: a case that receiver information (e.g., a telephone number, name, etc.) to be transmitted from the head unit to the HUD device (or cluster) exist Scenario 3: when attempting to call by using a user's mobile phone connected to the head unit, a case that caller information (e.g., phone number, name, etc.) to be transmitted from the head unit to the HUD device (or cluster) exist Scenario 4: when a streaming service is provided through a user's mobile phone connected to the head unit, a case that information (e.g., song title, song number, etc.) of the streaming service to be transmitted from the head unit to the HUD device (or cluster) exist The data message generated by the first communication node 410 may be configured as follows.

Figure 5:
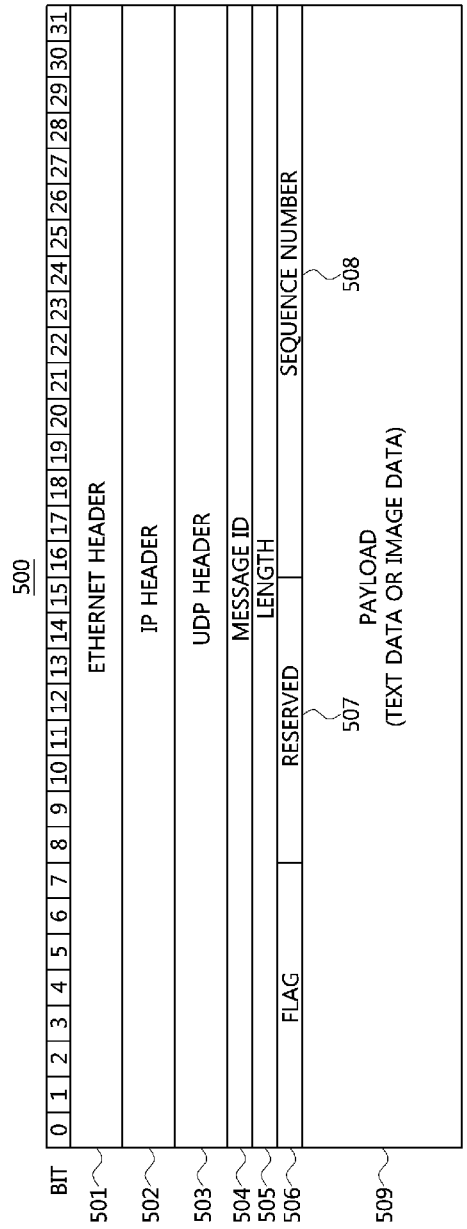
FIG. 5 is a block diagram illustrating a first embodiment of a data message in a vehicle network.

FIG. 5 is a block diagram illustrating a first embodiment of a data message in a vehicle network.

Referring to FIG. 5, a data message 500 may include an Ethernet header 501, an internet protocol (IP) header 502, a user datagram protocol (UDP) header 503, a message ID field 504, a length field 505, a flag field 506, a reserved field 507, a sequence number field 508, a payload 509, and the like.

The Ethernet header 501 may include a destination address (DA) field, a source address (SA) field, an Ethernet type field, and the like. The DA field of the Ethernet header 501 may have a size of 6 bytes and may include identification information (e.g., a medium access control (MAC) address) of a communication node (e.g., the second communication node 420) receiving the data message 500. The SA field of the Ethernet header 501 may have a size of 6 bytes and may include identification information (e.g., MAC address) of a communication node (for example, the first communication node 410) transmitting the data message 500.

The Ethernet type field of the Ethernet header 501 may have a size of 2 bytes and may indicate the type of the data message 500. For example, if the value indicated by the Ethernet type field is greater than hexadecimal 0x600, the Ethernet type field may indicate the DIX format (format) defined in a request for comments (RFC) 894. If the value indicated by the Ethernet type field is less than hexadecimal 0x600, then the Ethernet type field may indicate the sub-network access protocol (SANP) format or the service access point (SAP) format defined by the Institute of Electrical and Electronics Engineers (IETF). Here, the Ethernet type field may be set to a hexadecimal number 0x0300 indicating the internet protocol version 4 (IPv4).

The header 502 may have a size of 20 bytes to 60 bytes, and may include a protocol ID, checksum information, an SA IP address, a DA IP address, and the like. The UDP header 503 may have a size of 8 bytes, and may include a source port number, a destination port number, and checksum information. Alternatively, the data message 500 may include a transmission control protocol (TCP) header instead of the UDP header 503.

The message ID field 504 may have a size of 4 bytes and may be used to identify the data message 500 in the vehicle network. The message ID field 504 may also include information (i.e., an indicator) indicating the type of data (e.g., text data, image data) contained in the payload 509 of the data message 500. In this case, the most significant bit (MSB) or least significant bit (LSB) of the message ID field 504 may be set as shown in Table 1 below.

TABLE 1

| Bit value (hexadecimal) | Content |
|---|---|
| 0~5 | Control |
| 6~7 | Reserved |
| A | Diagnostic |
| B | Text |
| C | Image |
| D | Reserved |
| E | Calibration and test |

For example, if the bit value of the message ID field 504 is set to hexadecimal 0-5, the message ID field 504 may indicate that the data message 500 is used for transmission of control information. If the bit value of the message ID field 504 is set to hexadecimal 'A', the message ID field 504 may indicate that the data message 500 is used for diagnosis. If the bit value of the message ID field 504 is set to hexadecimal 'B', the message ID field 504 may indicate that the payload 509 of the data message 500 contains text data. If the bit value of the message ID field 504 is set to hexadecimal 'C', the message ID field 504 may indicate that the payload 509 of the data message 500 contains image data. If the bit value of the message ID field 504 is set to hexadecimal 'E', the message ID field 504 may indicate that the data message 500 is to be used for calibration and testing.

The length field 505 may have a size of 4 bytes and may indicate the length of the payload 509 of the data message 500. The flag field 506 may have a size of 1 byte and may be set to a specific value indicating specific information (or performing a specific operation). For example, the flag field 506 may be set as shown in Table 2 below.

TABLE 2

| Bit number | content |
|---|---|
| 0 | Acknowledgement (ACK) necessary flag |
| 1 | ACK flag |
| 2 | Remote transmission request (RTR) flag |
| 3-7 | Reserved |

The acknowledgment (ACK) necessary flag of the flag field 506 may indicate whether or not transmission of an ACK message in response to the corresponding message (e.g., the data message 500) is required. The ACK flag of the flag field 506 may indicate that the corresponding message is an ACK message. The remote transmission request (RTR) flag of the flag field 506 may indicate that the corresponding message has not been received within a predetermined time.

Information (i.e., an indicator) indicating the type of data (e.g., text data, image data) included in the payload 509 of the data message 500 may be included in the flag field 506 instead of the message ID field 504. For example, the fourth bit (e.g., bit #3) of the flag field 506 may be set to a type flag. The type flag set to '0' may indicate that the payload 509 of the data message 500 includes text data, and the type flag set to '1' may indicate that the payload 509 of the data message 500 includes image data.

The reserved field 507 may have a size of 1 byte. If the payload 509 includes text data, the reserved field 507 may include information (i.e., an indicator) indicating an encoding scheme of the text data. For example, the text data included in the payload 509 may be encoded based on one of encoding schemes such as an American standard code for information interchange (ASCII), a UNICODE, a universal transformation format 8 (UTF-8), an extended unix code (EUC-KR), a code page 949 (CP949), KSC5601, or ISO-8859-1. In this case, three bits in the reserved field 507 may be set to indicate the encoding scheme applied to the text data as shown in Table 3 below. Also, the encoding scheme of the text data is not limited to those of Table 3, and various encoding schemes other than those shown in Table 3 may be used.

TABLE 3

| Bit value (Binary) | Content |
|---|---|
| 000 | ASCII |
| 001 | UNICODE |
| 010 | UTF-8 |
| 011 | EUC-KR |
| 100 | CP949 |
| 101 | KSC5601 |
| 110 | ISO-8859-1 |
| 111 | Reserved |

If the payload 509 includes image data, the reserved field 507 may indicate at least one of an encoding scheme applied to the image data or resolution (e.g., the number of pixels) of the image data. For example, the image data included in the payload 509 may be encoded based on a bitmap (BMP) format, a graphics interchange format (GIF), a portable network graphics (PNG) format, a tagged image file format (TIFF), or a joint photographic coding experts group (JPEG) format. In this case, three bits in the reserved field 507 may be set to indicate the encoding scheme applied to the image data as shown in Table 4 below. The encoding scheme applied to the image data is not limited to table 4 below, and may be set variously.

TABLE 4

| Bit value (Binary) | Content |
| --- | --- |
| 000 | BMP |
| 001 | GIF |
| 010 | PNG |
| 011 | TIFF |
| 100 | JPEG |
| 101-111 | Reserved |

Also, the resolution of the image data included in the payload 509 may be set to 320×240, 640×480, 720×576, 1280×720, 1920×1080, 2560×1440, or 3840×2160. In this case, the three bits in the reserved field 507 may be set to indicate the resolution of the image data as shown in Table 5 below. Further, the resolution of the image data is not limited to Table 5 and may be variously set.

TABLE 5

| Bit value (Binary) | Content |
| --- | --- |
| 000 | 320 × 240 |
| 001 | 640 × 480 |
| 010 | 720 × 576 |
| 011 | 1280 × 720 |
| 100 | 1920 × 1080 |
| 101 | 2560 × 1440 |
| 110 | 3840 × 2160 |
| 111 | Reserved |

On the other hand, the sequence number field 508 may have a size of 2 bytes and may indicate the sequence number of the data message 500 (e.g., the sequence number of the payload 509 included in the data message 500). The payload 509 may include text data or image data.

For example, if the payload 509 of the data message 500 generated by the first communications node 410 includes text data, the message ID field 504 or the flag field 506 may indicate that the payload 509 contains text data, and the reserved field 507 may indicate the encoding scheme of the text data. Alternatively, if the payload 509 of the data message 500 generated by the first communications node 410 includes image data, the message ID field 504 or the flag field 506 may indicate that the payload 509 contains image data, and the reserved field 507 may indicate at least one of the encoding scheme of the image data and the resolution of the image data.

Referring again to FIG. 4, the first communication node 410 may transmit the data message 500 (S402). The second communication node 420 may receive the data message 500 by performing a monitoring operation on a link. When the data message 500 is received, the second communication node 420 may determine whether an address indicated by the DA field included in the Ethernet header 501 of the data message 500 matches the address of the second communication node 420. The second communication node 420 may discard the data message 500 if the address indicated by the DA field contained in the Ethernet header 501 differs from the address of the second communication node 420. On the other hand, if the address indicated by the DA field included in the Ethernet header 501 is the same as the address of the second communication node 420, the second communication node 420 may identify the information after the Ethernet header 501.

For example, the second communication node 420 may identify the type of data included in the payload 509 based on the message ID field 504 or the flag field 506 of the data message 500 (S403). If the message ID field 504 set on the basis of Table 1 indicates 'B', or if the type flag of the flag field 506 indicates '0', the second communication node 420 may determine the data included in the payload 509 as being text data. If the message ID field 504 set on the basis of Table 1 indicates 'C' or if the type flag of the flag field 506 indicates '1,' then the second communication node 420 may determine the data included in the payload 509 as being image data.

After the type of data contained in the payload 509 of the data message 500 has been identified, the second communication node 420 may identify the encoding scheme applied to the data included in the payload 509 based on the reserved field 507 of the data message 500. For example, when the data included in the payload 509 are text data, the second communication node 420 may determine that the reserved field 507 indicates the encoding scheme applied to the text data. If the reserved field 507 is set based on Table 3, the second communication node 420 may identify the encoding scheme indicated by the reserved field 507 based on Table 3.

When the data included in the payload 509 are image data, the second communication node 420 may determine that the reserved field 507 indicates at least one of the encoding scheme of the image data and the resolution of the image data. If the reserved field 507 is set based on Tables 4 and 5, the second communication node 420 may identify the encoding scheme indicated by the reserved field 507 based on Table 4, and identify the resolution indicated by the reserved field 507 based on Table 5.

After the encoding scheme applied to the data contained in the payload 509 of the data message 500 is identified, the second communication node 420 may decode the data (e.g., text data or image data) included in the payload 509 using a decoding scheme corresponding to the identified encoding scheme (S405). For example, the second communication node 420 may decode the text data based on the decoding scheme corresponding to the identified encoding scheme, and may decode the image data based on the identified resolution and the decoding scheme corresponding to the identified encoding scheme. When the decoding of the data contained in the payload 509 of the data message 500 is completed, the second communication node 420 may display the decoded result. Therefore, the user of the vehicle can confirm the performance result of the new IT service through the display device (for example, the second communication node).

The methods according to embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

What is claimed is:

1. An operation method of a first communication node in an Ethernet-based vehicle network, comprising:
generating a data message including data when there is data to be transmitted to a second communication node belonging to the Ethernet-based vehicle network;
transmitting the data message to the second communication node; and
receiving an acknowledge message indicating a result of a reception of the data message,
wherein the data message further comprises a first indicator indicating a purpose of the data message and a type of data which is included in a payload of the data message, a second indicator indicating an encoding scheme applied to the data, a third indicator indicating a resolution of the data which are image data, and a fourth indicator requesting transmission of the acknowledge message.

2. The operation method according to claim 1, wherein the data message includes an Ethernet header, an internet protocol (IP) header, a user datagram protocol (UDP) header, a message identifier (ID) field, a length field, a flag field, a reserved field, a sequence number field, and a payload including the data.

3. The operation method according to claim 2, wherein the first indicator is included in the message ID field, and indicates that the type of the data included in the payload is text or image.

4. The operation method according to claim 2, wherein the first indicator is included in the flag field, and indicates that the type of the data included in the payload is text or image.

5. The operation method according to claim 2, wherein the second indicator is included in the reserved field, and when the type of the data included in the payload is text, the second indicator indicates the encoding scheme applied to the data which are text data.

6. The operation method according to claim 2, wherein the second indicator is included in the reserved field, and when the type of the data included in the payload is image, the second indicator indicates the encoding scheme applied to the data which are image data.

7. The operation method according to claim 2, wherein the third indicator is included in the reserved field.

8. An operation method of a first communication node in an Ethernet-based vehicle network, comprising:
receiving a data message including data from a second communication node belonging to the Ethernet-based vehicle network;
identifying a purpose of the data message based on a first indicator included in the data message;
identifying a type of data which is included in a payload of the data message based on the first indicator;
identifying an encoding scheme applied to the data based on the type of the data and a second indicator included in the data message;
decoding the data included in the data message using a decoding scheme corresponding to the encoding scheme; and
when a decoding operation of the data is completed, transmitting an acknowledge message based on a requirement of the acknowledge message,
wherein the data message further comprises a third indicator indicating a resolution of the data which are image data, and a fourth indicator requesting transmission of the acknowledge message.

9. The operation method according to claim 8, wherein the data message includes an Ethernet header, an internet protocol (IP) header, a user datagram protocol (UDP) header, a message identifier (ID) field, a length field, a flag field, a reserved field, a sequence number field, and a payload including the data.

10. The operation method according to claim 9, wherein the first indicator is included in the message ID field, and indicates that the type of the data included in the payload is text or image.

11. The operation method according to claim 9, wherein the first indicator is included in the flag field, and indicates that the type of the data included in the payload is text or image.

12. The operation method according to claim 9, wherein the second indicator is included in the reserved field, and when the type of the data included in the payload is text, the second indicator indicates the encoding scheme applied to the data which are text data.

13. The operation method according to claim 9, wherein the second indicator is included in the reserved field, and when the type of the data included in the payload is image, the second indicator indicates the encoding scheme applied to the data which are image data.

14. The operation method according to claim 9, wherein the third indicator is included in the reserved field.

15. A first communication node in an Ethernet-based vehicle network comprising a processor and a memory storing at least one instruction executed by the processor, wherein the at least one instruction is configured to:
generate a data message including data when there is data to be transmitted to a second communication node belonging to the Ethernet-based vehicle network;
transmit the data message to the second communication node; and
receive an acknowledge message indicating a result of a reception of the data message;
wherein the data message further comprises a first indicator indicating a purpose of the data message and a type of data which is included in a payload of the data message, a second indicator indicating an encoding scheme applied to the data, a third indicator indicating a resolution of the data which are image data, and a fourth indicator requesting transmission of the acknowledge message.

16. The first communication node according to claim 15, wherein the data message includes an Ethernet header, an internet protocol (IP) header, a user datagram protocol (UDP) header, a message identifier (ID) field, a length field, a flag field, a reserved field, a sequence number field, and a payload including the data.

17. The first communication node according to claim 16, wherein the first indicator is included in the message ID field or the flag field, and indicates that the type of the data included in the payload is text or image.

18. The first communication node according to claim 16, wherein the second indicator is included in the reserved field, and when the type of the data included in the payload is text, the second indicator indicates the encoding scheme applied to the data which are text data.

19. The first communication node according to claim 16, wherein the second indicator is included in the reserved field, and when the type of the data included in the payload is image, the second indicator indicates the encoding scheme applied to the data which are image data.

20. The first communication node according to claim 16, wherein the third indicator is included in the reserved field.

* * * * *